US008341660B2

(12) United States Patent
Barnett

(10) Patent No.: US 8,341,660 B2
(45) Date of Patent: Dec. 25, 2012

(54) PROGRAM PROMOTION FEEDBACK

(75) Inventor: Sharon F Barnett, Belmont, CA (US)

(73) Assignee: Microsoft Corporation, Redmond, WA (US)

( * ) Notice: Subject to any disclaimer, the term of this patent is extended or adjusted under 35 U.S.C. 154(b) by 553 days.

(21) Appl. No.: 12/022,989

(22) Filed: Jan. 30, 2008

(65) Prior Publication Data
US 2009/0193460 A1    Jul. 30, 2009

(51) Int. Cl.
*H04N 7/16* (2006.01)
*H04N 7/173* (2006.01)
*H04N 7/10* (2006.01)
*H04N 7/025* (2006.01)
*H04H 60/33* (2008.01)

(52) U.S. Cl. ............... 725/22; 725/9; 725/24; 725/32; 725/86; 725/87; 725/105

(58) Field of Classification Search ............ 725/39
See application file for complete search history.

(56) References Cited

U.S. PATENT DOCUMENTS

| | | | |
|---|---|---|---|
| 4,885,632 A * | 12/1989 | Mabey et al. | 725/20 |
| 6,286,140 B1 | 9/2001 | Ivanyi | |
| 6,393,407 B1 | 5/2002 | Middleton et al. | |
| 6,604,239 B1 | 8/2003 | Kohen | |
| 6,714,992 B1 | 3/2004 | Kanojia et al. | |
| 7,237,250 B2 | 6/2007 | Kanojia et al. | |
| 7,243,362 B2 | 7/2007 | Swix et al. | |
| 7,716,703 B2 * | 5/2010 | Sheldon | 725/44 |
| 2001/0039656 A1 * | 11/2001 | Nakamura et al. | 725/9 |
| 2002/0059637 A1 * | 5/2002 | Rakib | 725/119 |
| 2002/0069407 A1 | 6/2002 | Fagnani et al. | |
| 2002/0073419 A1 | 6/2002 | Yen et al. | |
| 2003/0126605 A1 * | 7/2003 | Betz et al. | 725/39 |
| 2003/0126611 A1 * | 7/2003 | Chernock et al. | 725/105 |
| 2003/0145323 A1 | 7/2003 | Hendricks et al. | |
| 2003/0149975 A1 * | 8/2003 | Eldering et al. | 725/34 |
| 2004/0221308 A1 * | 11/2004 | Cuttner et al. | 725/46 |
| 2007/0073585 A1 | 3/2007 | Apple et al. | |
| 2007/0124755 A1 * | 5/2007 | Shintani | 725/13 |
| 2007/0157220 A1 * | 7/2007 | Cordray et al. | 725/9 |
| 2008/0092159 A1 * | 4/2008 | Dmitriev et al. | 725/34 |
| 2008/0115166 A1 * | 5/2008 | Bhogal et al. | 725/46 |
| 2008/0295126 A1 * | 11/2008 | Lee et al. | 725/10 |

OTHER PUBLICATIONS

Story, "Nielsen to Follow TV Viewers Out of the House and Into the Streets", Apr. 13, 2007, The New York Times Company, pp. 1-3.
"Television: Counting the Eyeballs", Jan. 16, 2006, The McGraw-Hill Companies Inc., pp. 1-3.
Benkoil, "Video Report: Networks and Studios Applying New Measures to TV Promotion", 2007, MediaVillage, LLC., pp. 3.

* cited by examiner

*Primary Examiner* — Justin Shepard
(74) *Attorney, Agent, or Firm* — Wolfe-SBMC

(57) ABSTRACT

A user request to watch a program is received in response to a promotion for the program. One or both of recording the program and playback of the program is performed. Information regarding one or both of the recording and the playback is output, this information including an identifier of the promotion. Additionally, a report can be generated from this information output by multiple devices, the report describing the recording of the program and the playback of the program on the multiple device in response to the promotion.

16 Claims, 6 Drawing Sheets

PROGRAM PROMOTION FEEDBACK

BACKGROUND

Television program providers oftentimes distribute promotions advertising their programs to entice viewers to watch the programs. Although such promotions can be effective in enticing viewers to watch the programs, various problems exist with these promotions. One problem is that there is typically no way for a program provider to accurately know whether the promotions for a particular program are effective in enticing viewers to watch the program. Furthermore, multiple different promotions may be played for the same program, and there is typically no way for a program provider to accurately know how effective those different promotions were relative to one another. Thus, even though program providers can invest large amounts of money in generating and distributing promotions, they typically have no feedback regarding how effective their advertising was.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a user request to watch a program is received in response to a promotion for the program. One or both of recording the program and playback of the program is performed. Information regarding one or both of the recording and the playback is output, this information including an identifier of the promotion.

In accordance with one or more aspects, data regarding one or both of recording of a program by a device and playback of the program by the device is received from each of multiple devices. A first promotion of multiple promotions for the program is selected. The received data regarding one or both of recording of the program and playback of the program in response to the first promotion is identified. Using the identified data, a report is generated describing the recording of the program and the playback of the program in response to the first promotion.

In accordance with one or more aspects, multiple different promotions for a program are distributed to different users, each of the multiple different promotions including a promotion identifier. Feedback is received from different consumer devices used by the different users. This feedback includes information regarding, for each promotion identifier, recording of the program and playback of the program at the different consumer devices.

BRIEF DESCRIPTION OF THE DRAWINGS

The same numbers are used throughout the drawings to reference like features.

DETAILED DESCRIPTION

Program promotion feedback is discussed herein. Multiple different promotions are generated for a program and played back to multiple different users. While the promotion is playing (or shortly after the promotion finishes) the user is able to request to watch the program, which can include recording the program and/or beginning playback of the program immediately. When such a request to watch the program is received, an identifier of the promotion is recorded and the requested recording and/or playback is carried out. Additionally, various data regarding the recording and/or playback of the program is collected, such as whether the program was played back in its entirety, the elapsed time between recording and playback of the program, and so forth. This collected data from multiple users, including the promotion identifiers, is returned to the program provider. This data provides feedback to the program provider regarding which particular promotions enticed users to actually record and/or playback the program.

Figure 1:
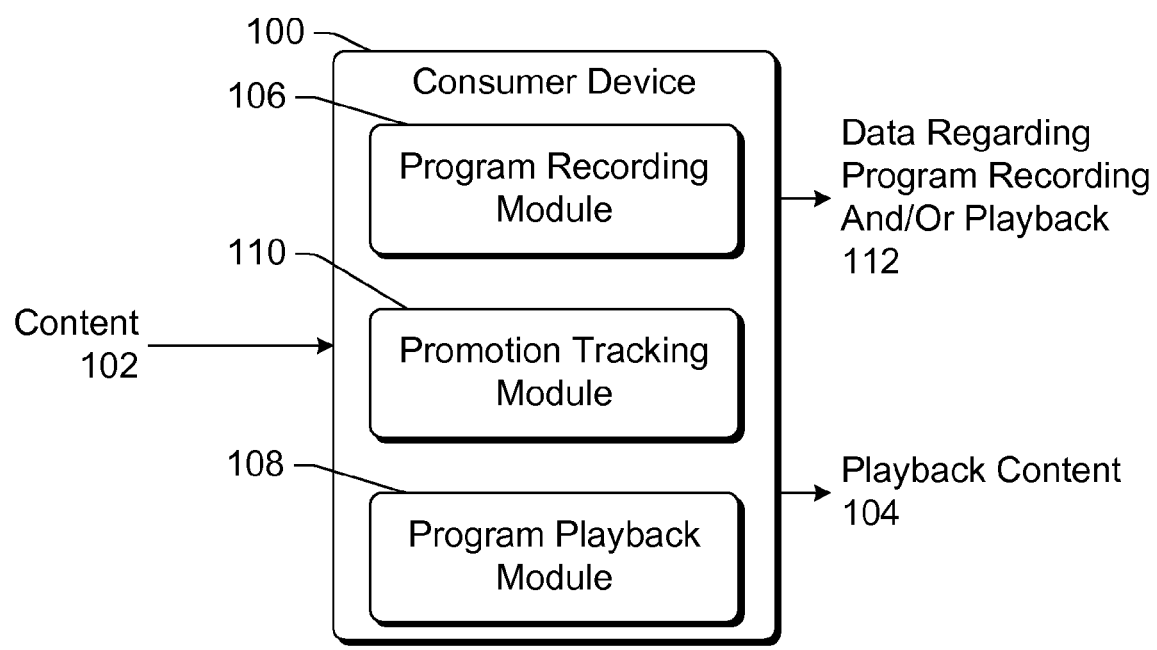
FIG. 1 is a block diagram illustrating an example consumer device implementing the program promotion feedback in accordance with one or more embodiments.

FIG. 1 is a block diagram illustrating an example consumer device 100 implementing the program promotion feedback in accordance with one or more embodiments. Consumer device 100 can be any of a variety of devices capable of controlling recording and/or playback of content. For example, consumer device 100 can be a desktop computer, a mobile station, an entertainment appliance, a set-top box communicatively coupled to a display device, a television, a wireless phone, a game console, an automotive computer, and so forth. Thus, consumer device 100 may range from a full resource device with substantial memory and processor resources (e.g., personal computers, game consoles) to a low-resource device with limited memory and/or processing resources (e.g., traditional set-top boxes, hand-held game consoles).

Consumer device 100 receives content 102, which typically includes video and/or audio content. Consumer device 100 controls the reception of content 102, the recording of content 102, and/or the playback of content 102 in any of a variety of conventional manners. Content 102 typically includes program content (e.g., television shows, movies, and so forth), as well as promotion content advertising the program content. Content 102 also oftentimes includes other commercial content advertising other products and/or services.

Content 102 can be received from one or more of any of a variety of different sources, such as a broadcast center or other content distributor, from a video-on-demand server, from a local storage device (e.g., a hard disk, a DVD (digital video disk or digital versatile disk), etc.), from a networked storage device (e.g., over the Internet or an intranet), and so forth. Different portions of content 102 can come from the same or alternatively different sources. For example, program content can be received from one source and promotion content from another source. Content 102 can also be received via any of a variety of different transmission media, such as via an IP-based network, via a terrestrial analog or digital signal, via a cable system, via a satellite system, and so forth. Programs and/or other content can be broadcast to consumer device 100 using any of these different transmission media.

Recording of content 102 includes storage of content 102 on a local device (e.g., a hard disk, DVD, etc.) and/or a remote device (e.g., a remote server). Playback of content 102 includes outputting of playback content 104. Playback content 104 can be output as content 102 is received (typically with a short delay as content 102 is processed to generate playback content 104), or alternatively after content 102 has been recorded and stored for a longer period of time (e.g., on the order of minutes, hours, days, weeks, etc.).

Consumer device 100 generates a signal as playback content 104 that allows the particular content to be presented visually by a display device, with or without additional processing being performed by the display device. Playback content 104 also typically includes audio content that can be played back by the display device or alternatively another audio playback device. The display device can be any device capable of displaying video, such as a television, a monitor, a projector, and so forth. The display device is also optionally capable of playing back audio content. In one or more embodiments, consumer device 100 itself is the display device. Alternatively, consumer device 100 can provide a signal as playback content 104 to a display device (and optionally to a separate audio playback device), such as via one or more of an RF (radio frequency) link, S-video link, composite video link, component video link, DVI (digital video interface), analog audio connection, digital audio connection, or other communication link.

Figure 2:
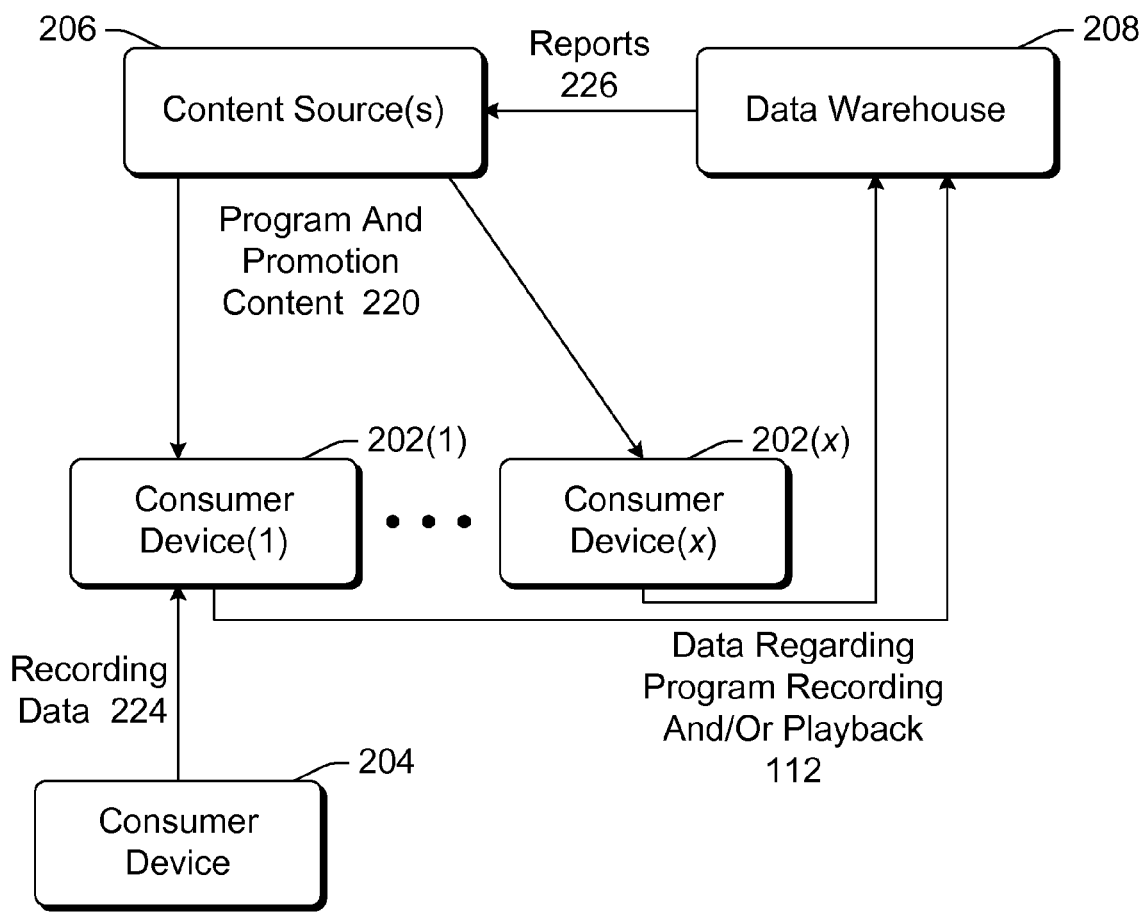
FIG. 2 illustrates an example system in which the program promotion feedback can be used in accordance with one or more embodiments.

FIG. 2 illustrates an example system 200 in which the program promotion feedback can be used in accordance with one or more embodiments. System 200 includes consumer devices 202(1), . . . , 202(x), and 204, one or more content sources 206, and a data warehouse 208. Consumer devices 202 and 204 can each be, for example, a consumer device 100 of FIG. 1.

Program and promotion content 220 is sent to consumer devices 202 by content source 206. Content 220 can be, for example, content 102 of FIG. 1. Content 220 can be received from a single content source 206 or alternatively from multiple content sources 206.

Content 220 includes program content such as television shows, movies, and so forth. Content 220 also includes promotion content advertising particular programs (particular program content) attempting to entice viewers to watch the particular programs. Promotion content and program content can be received by consumer devices 202 from the same content source 206, or alternatively promotion content can be received from a different content source than program content.

During operation, a user of a particular device 202 watches promotion content promoting a corresponding program and enters a request to watch the corresponding program. The request to watch the corresponding program can be a request to playback the program immediately if the program is immediately available, such as from a video-on-demand server or if the program is currently being broadcast by content source 206. It is to be appreciated that some delay may be incurred even if the program is immediately available, such as time to tune to a particular channel and/or process content 220 for display. The request to watch the program can also be a request to record the program if the program is going to be broadcast at a later time. The request to watch the program can also be a request to both playback and record the program.

Consumer device 202 records an identifier of the promotion that was being played back to the user of device 202 and in response to which the request to watch the corresponding program was received. This promotion identifier is sent to data warehouse 208. Similarly, identifiers of other promotions that were played back to the user of device 202 (as well as users of other consumer devices 202) and in response to which the request to watch the corresponding program was received are also sent to data warehouse 208.

Furthermore, consumer device 202 monitors the recording and/or playback of the corresponding program and sends data regarding the program recording and/or playback to data warehouse 208. Thus, for each promotion sent to a consumer device 202 in response to which a request to watch the corresponding program is received from a user of device 202, an identifier of the promotion as well as other data regarding the program recording and/or playback is sent to data warehouse 208.

Data warehouse 208 collects the promotion identifiers and other data regarding the program recording and/or playback at devices 202. Data warehouse 208 can then identify which promotion identifiers caused users of devices 202 to request to watch the corresponding program. Data warehouse 208 can further identify, for each promotion identifier, other data regarding the recording and/or playback as received from the devices 202. Reports 226 regarding this various data collected by data warehouse 208 can then be forwarded to content source 206, other content authors or providers, other promotion authors or providers, and/or other recipients.

The user can request to watch a program and playback that program on the same consumer device 202 or alternatively different devices. In the illustrated example of FIG. 2, a user of consumer device 204 can watch a promotion corresponding to a program and enter a user request to watch the corresponding program. In response to such a request, consumer device 204 sends recording data 224 to consumer device 202. Recording data 224 includes a promotion identifier for the promotion that was being played back on device 204 and in response to which the user entered the request to watch the corresponding program. Recording data 224 further includes information describing the corresponding program so that consumer device 202 can record the program when the program is broadcast. Any information that describes the corresponding program can be included in recording data 224, such as a unique identifier of the corresponding program (e.g., an alphanumeric string, or a Uniform Resource Locator (URL)), a combination of channel, date and time at which the program will be broadcast, and so forth. Consumer device 202 receives recording data 224 and records the corresponding program in the same manner as if the request to record the program had been entered by the user on computing device 202.

For example, consumer device 204 can be a desktop computer, cell phone, or other device via which a user is surfing the web. A promotion for a program can be played back to the user of device 204 while he or she is surfing, and the user can enter a request to watch the program. A consumer device 202 corresponding to the user is identified. The user can enter this identification, or alternatively the corresponding consumer device 202 can be automatically identified. For example, the user may be associated with a particular consumer device 202 by a username and/or password that was entered in response to his or her request to watch the program (or alternatively previously entered by the user, such as in order to watch the promotion). By way of another example, an identifier of consumer device 204 (e.g., an Internet Protocol (IP) address, a user name, another account identifier, etc.) can be associated with a particular consumer device 202 by the user of device 202 and/or 204, by a seller or service provider of or for device 204, and so forth.

Once the user requests to watch the corresponding program in response to the promotion, recording data 224 for the corresponding program is sent to consumer device 202. Consumer device 202, in turn, records the program so that the user can playback the program at device 202 at a later time.

In the example of FIG. 2, data warehouse 208 is illustrated as receiving data regarding program recording and/or playback 112. Alternatively, data warehouse 208 is not included in system 200, and data 112 is returned directly to content source 206, to another content author or provider, and/or to another recipient.

Returning to FIG. 1, consumer device 100 includes a program recording module 106, a program playback module 108, and a promotion tracking module 110. Program recording module 106 manages the recording of content 102 onto local and/or remote storage devices. Program recording module 106 can record programs in response to requests from users of device 100 and/or other devices (e.g., a device 204 of FIG. 2).

Program playback module 108 generates and outputs playback content 104. Playback content 104 can be generated from content 102 as content 102 is received, or alternatively from content recorded on a local and/or remote storage device. In one or more embodiments, program playback module 108 further allows the user of device 100 to control playback of content 104, including pausing or stopping playback, fast forwarding through the content, rewinding through the content, and so forth.

Promotion tracking module 110 tracks the promotions that enticed a user (also referred to as a viewer or consumer) of device 100 to record and/or playback particular programs. Promotion tracking module 110 also generates and outputs data regarding recording of a program and/or playback of a program 112. The data regarding recording and/or playback of a program 112 provides feedback regarding how well the promotion for the program enticed users to record and/or playback the program. This feedback can be provided to any of a variety of different components or parties, such as the program provider, the promotion provider, and so forth.

During operation, promotion tracking module 110 records an identifier of the promotion that was being played back to the user of device 100 in response to which the request to watch the corresponding program was received. The request to watch the program can be a request to watch the program immediately in situations where the program is immediately available, and/or a request to record the program if the program is going to be broadcast at a later time. Promotion tracking module 110 can identify that a request to watch a corresponding program was received in response to a particular promotion in any of a variety of different manners.

In one or more embodiments, promotion content played back to a user has an embedded trigger that allows the user to automatically record the corresponding program. An alert can optionally be displayed to the user notifying the user that he or she can easily record the corresponding program by entering a record option while the promotion is being played back. For example, the user can enter a "select", "record", or similar option on a remote control corresponding to device 100 (or alternatively on device 100) to indicate that he or she desires to watch the program. In response to selection of such an option, program recording module 106 records the corresponding program when the program is subsequently broadcast. Such embedded triggers and automatic recording of a program can be implemented in any of a variety of different manners that are well known to those skilled in the art.

In one or more other embodiments, promotion tracking module 110 monitors playback content 104 and identifies when playback content 104 includes a promotion. This identification can be performed in different manners, such as by identifying a particular "promotion" header or other flag included in the playback content 104 (typically inserted by the source of content 102 to identify promotions to promotion tracking module 110), identifying a promotion identifier in the playback content 104, accessing a record (e.g., a table or list) made available by the source of content 102 identifying what promotions are broadcast at what times on what channels, and so forth. When identifying that playback content 104 includes a promotion, promotion tracking module 110 also identifies the program corresponding to the promotion. The program corresponding to the promotion can be identified, for example, by a program identifier embedded in the promotion content, by having unique promotion identifiers for different programs so that the corresponding program can be identified (e.g., by lookup in a table or list) using the promotion identifier, by accessing a record (e.g., a table or list) made available by the source of content 102 identifying the programs corresponding to particular promotions broadcast at particular times on particular channels, and so forth.

Promotion tracking module 110 can then communicate with program recording module 106 to determine if the user requests to record the corresponding program. If the user requests to record the corresponding program while the promotion is being played back, or within a threshold amount of time after the promotion is played back (e.g., thirty seconds, two minutes, etc.), then promotion tracking module 110 assumes that the request to record the program was made by the user in response to the promotion. Similarly, if the corresponding program is currently available (e.g., from a video-on-demand server, or is currently being broadcast), then promotion tracking module 110 can communicate with program playback module for playback of the program to begin immediately.

Alternatively, even though multiple promotions can correspond to the same program, only a single one of those promotions may be sent (possibly multiple times) to device 100. In such situations, if promotion tracking module 110 identifies that the promotion was played back on device 100 (as playback content 104) using any of the techniques discussed above, and the user also watched the program (recorded the program or watched the program "live" as it was broadcast), then promotion tracking module 110 can assume that the user watching the program was in response to that particular promotion that was sent to device 100. In other alternatives, if only a single one of multiple different promotions is sent to device 100, then a source of content 102 can maintain a record of which promotion was sent to device 100, thereby alleviating device 100 of the burden of maintaining the record. Promotion tracking module 110 can optionally return an indication to the source of content 102 that a particular promotion was played back as playback content 104, thereby informing the source of content 102 that the promotion was actually played back at consumer device 100 (e.g., the promotion was broadcast on a particular channel at times when device 100 was playing back content 102 on that channel).

Although examples of different manners in which promotion tracking module 110 can identify that a request to watch a corresponding program was received in response to a particular promotion are described, it is to be appreciated that any of a variety of different manners can be used. Any technique that allows playback of a promotion to be associated with a particular program can be used by promotion tracking module 110.

Additionally, each promotion has a corresponding promotion identifier. The identifier of the promotion that was being played back to the user of device 100 in response to which the request to watch the corresponding program was received can be determined by promotion tracking module 110 in any of a variety of different manners. In one or more embodiments, the promotion content itself includes the promotion identifier. Alternatively, promotion tracking module 110 can determine the promotion identifier in other manners. For example, a table or other record of promotions that are sent at particular times on particular channels can be maintained (e.g., by the source of content 102 or by some other party or device), and this record can be accessed by promotion tracking module 110 to obtain a promotion identifier for a promotion played back by device 100 at a particular time.

In other embodiments, rather than maintaining a particular promotion identifier, program playback module 108 can maintain a record of promotions that were played back as content 104 by device 100. This record can be returned to the source of content 102 or some other party or device (e.g., data warehouse 208 of FIG. 2), and the source of content 102 or another party or device can determine the promotion identifiers that were played back. The source of content 102 or the other party or device can determine the promotion identifiers that were played back in different manners, such as based on a table or other record of promotions that are sent at particular times on particular channels discussed above.

Although examples of different manners in which the promotion identifier can be determined are described, it is to be appreciated that any of a variety of different manners can be used. Any technique that allows a particular identifier to be correlated with a particular promotion can be used by promotion tracking module 110.

Promotion tracking module 110 outputs the promotion identifier of the promotion that was being played back to the user of device 100 in response to which the request to watch the corresponding program was received as part of the data regarding program recording and/or playback 112. Alternatively, if the request to watch the corresponding program was made at some other device (e.g., device 204 of FIG. 2), then the promotion identifier can be output by that other device. Data 112 can be output to different sources as discussed above, such as a source of content 102, data warehouse 208 of FIG. 2, and so forth. In one or more embodiments, promotion tracking module 110 sends the promotion identifier as data 112 as soon as the request to watch the corresponding program is received by device 100. Alternatively, promotion tracking module 110 can send the promotion identifier as data 112 at other times, such as after the corresponding program is recorded, after the corresponding program is played back as playback content 104, and so forth.

Additionally, for each program that a user request to watch the program was received in response to a promotion played back to the user of device 100, promotion tracking module 110 also maintains various information regarding the recording and/or playback of the program. This information can be obtained by monitoring playback content 104, and/or from one or both of program recording module 106 and program playback module 108. This various information maintained is output as data 112 (to any of a variety of different sources as discussed above). In one or more embodiments this information is output as data 112 after some particular event occurs (e.g., playback of the program is completed, recording of the program is completed, the recorded program is deleted without having been played back, and so forth). Alternatively, this information can be output as data at other times, such as at regular or irregular intervals.

Information identifying any aspect of the recording and/or playback of a program can be maintained. For example, interval information can be maintained, such as the elapsed time between receiving the request to watch the program and the program being recorded can be maintained, the elapsed time between recording the program and playback of the program can be maintained, if the program is played back multiple times then the elapsed time between each playback can be maintained, and so forth. By way of another example, event occurrence information can be maintained, such as whether the program was actually recorded (or whether the scheduled recording of the program was deleted before the program was recorded), whether the recorded program was actually played back (or whether the recorded program was deleted without being played back), and so forth. By way of yet another example, duration information can be maintained, such as whether the program was played back in its entirety, whether the user fast forwarded or rewound over portions of the program, whether playback of the program was paused and resumed at a later time, and so forth.

In one or more embodiments, promotion tracking module 110 tracks promotions for services in addition to tracking promotions for programs. Services refer to one or more services offered by consumer device 100, by a supplier or manufacturer of consumer device 100, and/or by some other party associated with consumer device 100. For example, consumer device 100 can be a set-top box, and the company supplying the set-top box may offer cable television services, cable telephone services, wireless telephone services, and so forth. Promotions can be played back to a user of consumer device 100 to entice the user to purchase additional services, such as an upgraded channel package for cable television, new wireless telephone service if the user does not already have wireless telephone service from that company, and so forth. One or more modules (not shown) can optionally be included in consumer device 100 to allow for the adding or upgrading of such services.

Accordingly, promotions for these services can be played back to the user, and the promotions correspond to a particular service rather than a particular program. The corresponding promotion identifier can be recorded as discussed above, and data regarding the user's selection to add or upgrade the corresponding service can be sent as data 112 rather than data regarding recording and/or playback of a program. The promotion identifier recording and data outputting for services is analogous to that discussed above with programs, except that the promotion corresponds to a service rather than a program.

Figure 3:
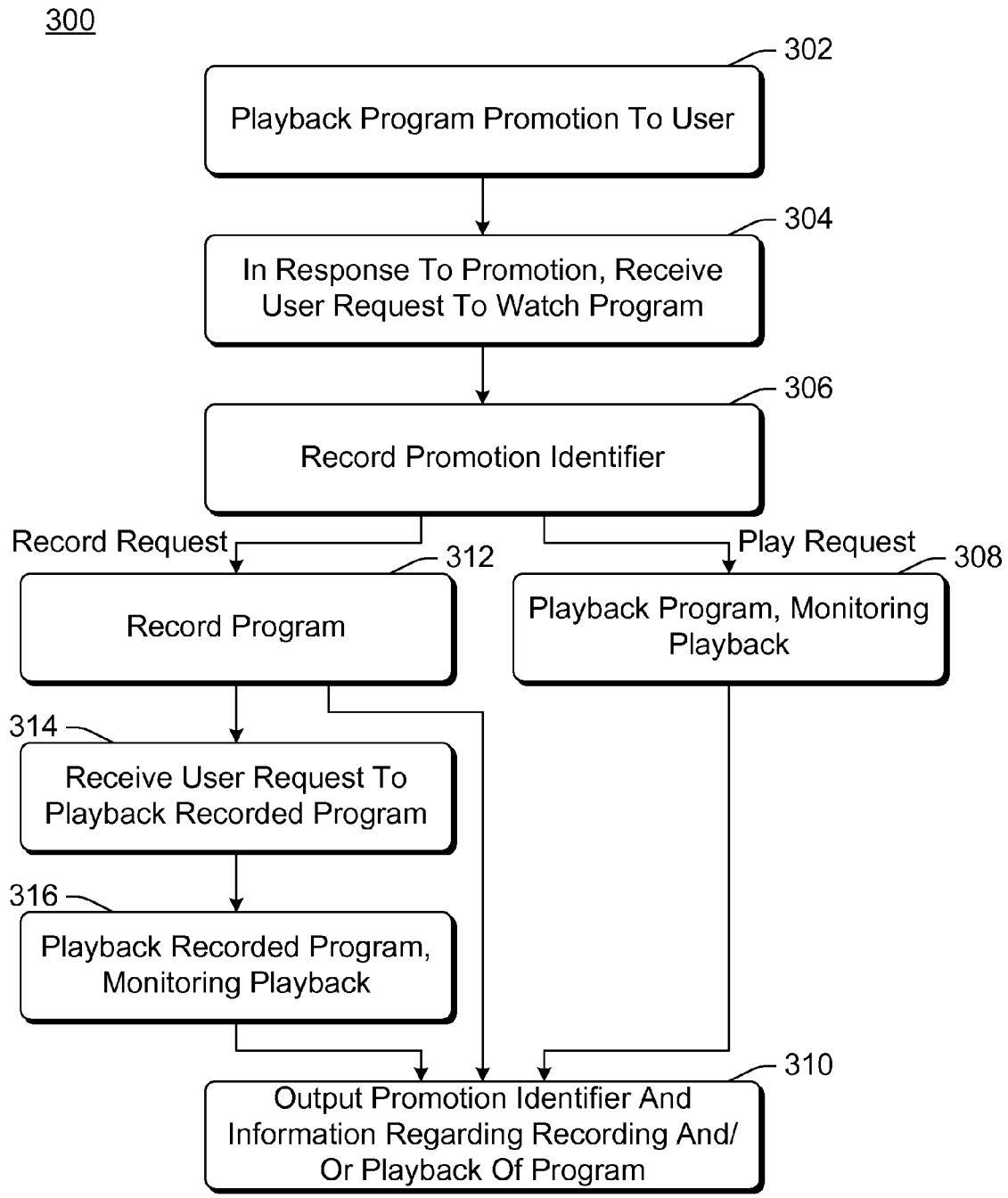
FIG. 3 is a flowchart illustrating an example process for the program promotion feedback in accordance with one or more embodiments.

FIG. 3 is a flowchart illustrating an example process 300 for the program promotion feedback in accordance with one or more embodiments. Process 300 is carried out by one or more devices, such as device 100 of FIG. 1, a device 202 of FIG. 2, or a device 202 and a device 204 of FIG. 2. Process 300 can be implemented in software, firmware, hardware, or combinations thereof. Process 300 is an example process for one or more aspects of the program promotion feedback; additional discussions of program promotion feedback are also included herein with reference to other Figures.

Initially, a promotion for a program is played back to a user (act 302). This promotion can be played back on the same device as the user will record or playback the program, or alternatively a different device. In response to the promotion, a user request to watch the program is received (act 304). This user request can be a request to playback the program and/or record the program.

An identifier of the promotion is recorded (act 306). This identifier can be obtained in any of a variety of different manners as discussed above. Optionally as part of act 306, both the promotion identifier and an indication that the request to watch the program was received can be output (e.g., as data regarding program recording and/or playback 112 of FIG. 1). Process 300 then proceeds based on whether the request to watch the program is a request to playback the program and/or a request to record the program. If the request to watch the program includes a request to playback the program, then the program is played back and this playback is monitored (act 308). The playback is monitored to obtain any of a variety of different information regarding playback of the program as discussed above (e.g., interval information, duration information, and so forth).

The promotion identifier recorded in act 306 as well as the information regarding the playback of the program is output (act 310). This identifier and information are output as, for example, data regarding program recording and/or playback 112 of FIG. 1. The promotion identifier is sent along with the other information regarding the playback of the program so that the information regarding the playback of the program is associated with that particular promotion identifier. As discussed above, the promotion identifier and/or other data regarding playback of the program can be output at various times. For example, both the promotion identifier and an indication that the request to watch the program was received can be output in response to receiving the request to watch the program in act 304 or as part of act 306. Then, additional information regarding the playback of the program can be output in response to (e.g., after and/or during) playback of the program.

Returning to act 306, if the request to watch the program includes a request to record the program, then the program is recorded when it is broadcast and this recording is monitored (act 312). The recording is monitored to obtain any of a variety of different information regarding recording of the program as discussed above (e.g., interval information, event occurrence information, duration information, and so forth). The promotion identifier recorded in act 306 as well as the information regarding the recording of the program is output (act 310). The promotion identifier is sent along with the other information regarding the recording of the program so that the information regarding the recording of the program is associated with that particular promotion identifier.

In some situations, the recorded program is not played back. In such situations, the promotion identifier recorded in act 306, as well as information indicating that the recording was deleted before it was played back, is output in act 310. The promotion identifier is sent along with the information indicating that the recording was deleted before it was played back so that this information is associated with that particular promotion identifier. As discussed above, the promotion identifier and/or other data regarding playback of the program can be output at various times. For example, both the promotion identifier and an indication that the request to watch the program was received can be output in response to receiving the request to watch the program in act 304 or as part of act 306. Then, additional information regarding the recording of the program can be output in response to (e.g., after and/or during) recording of the program.

In other situations, a user request to playback the recorded program is subsequently received (act 314). In response to this request in act 314, the recorded program is played back and this playback is monitored (act 316). The playback is monitored to obtain any of a variety of different information regarding playback of the program as discussed above (e.g., interval information, duration information, and so forth). The promotion identifier recorded in act 306 as well as the information regarding the playback of the program is output (act 310). The promotion identifier is sent along with the other information regarding the playback of the program so that the information regarding the playback of the program is associated with that particular promotion identifier. As discussed above, the promotion identifier and/or other data regarding playback of the program can be output at various times. For example, both the promotion identifier and an indication that the request to watch the program was received can be output in response to receiving the request to watch the program in act 304 or as part of act 306. Then, additional information regarding the recording of the program can be output in response to (e.g., after and/or during) recording of the program in act 312, and additional information regarding the playback of the program can be output in response to (e.g., after and/or during) playback of the program in act 316.

Figure 4:
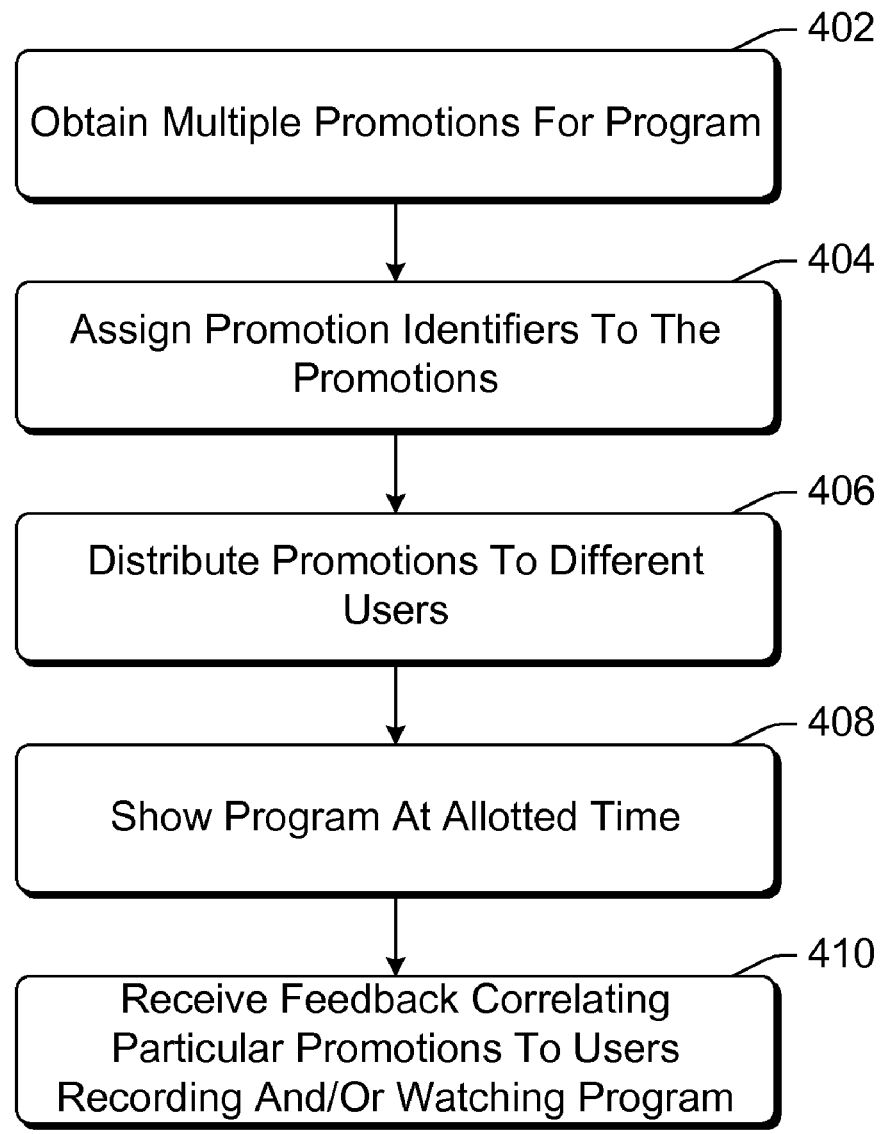
FIG. 4 is a flowchart illustrating another example process for the program promotion feedback in accordance with one or more embodiments.

FIG. 4 is a flowchart illustrating an example process 400 for the program promotion feedback in accordance with one or more embodiments. Process 400 is carried out by a content source, such as a source of content 102 of FIG. 1 or a content source 206 of FIG. 2, and can be implemented in software, firmware, hardware, or combinations thereof. Process 400 is an example process for one or more aspects of the program promotion feedback; additional discussions of program promotion feedback are also included herein with reference to other Figures.

Initially, multiple promotions are obtained for a particular program (act 402). These multiple promotions can be generated by the content source implementing process 400 or alternatively can be obtained by the content source from some other device or source. The multiple promotions can differ from one another in any of a variety of different manners, such as having different durations, highlighting or showcasing different actors or actresses, including previews of different portions of the program, and so forth. Each of the multiple promotions is intended to entice the user to watch the corresponding program, and each attempts to do so in a different manner.

Different promotion identifiers are assigned to the multiple promotions (act 404). The promotion identifier for a particular promotion uniquely identifies that promotion among the multiple promotions corresponding to the program. The promotion identifier can be included as part of the promotion, or alternatively can be maintained separately as discussed above.

The different promotions are then distributed to different users (act 406). This promotions can be distributed in different manners, typically including sending the promotions interspersed with program content (e.g., to be displayed as advertisements or commercials during various programs). The promotions can also be delivered in other manners, such as promotions displayed to users via web sites.

In one or more embodiments, the content source (or alternatively another party) targets particular promotions for particular audiences. This targeting can be accomplished in any of a variety of manners. The content source or other parties can obtain information regarding viewing habits or patterns of various users, communities, and so forth in any of a variety of conventional manners. This information can then be used to target particular promotions to particular audiences.

The granularity at which audiences can be targeted can vary by implementation and based on the manner in which the content is distributed to consumer devices. For example, if an IP-based network is used to transmit the content to the consumer devices, then individual consumer devices can be targeted with particular promotions. By way of another example, if a terrestrial digital signal is used to transmit the content to the consumer devices, then particular markets (within the range of the terrestrial broadcast digital signal) can be targeted with particular promotions but all consumer devices within those markets are targeted with the same promotions.

The promoted program is then shown at the allotted time (act 408). Feedback correlating particular promotions to user recording and/or playback of the program is also received (act 410). This feedback can be received directly from the consumer devices (e.g., as data 112 of FIG. 1), or alternatively from some other party (e.g., as reports 226 from data warehouse 208 of FIG. 2). The feedback provides the content provider with information regarding how well the multiple promotions from act 402 enticed users to record and/or playback the program.

Figure 5:
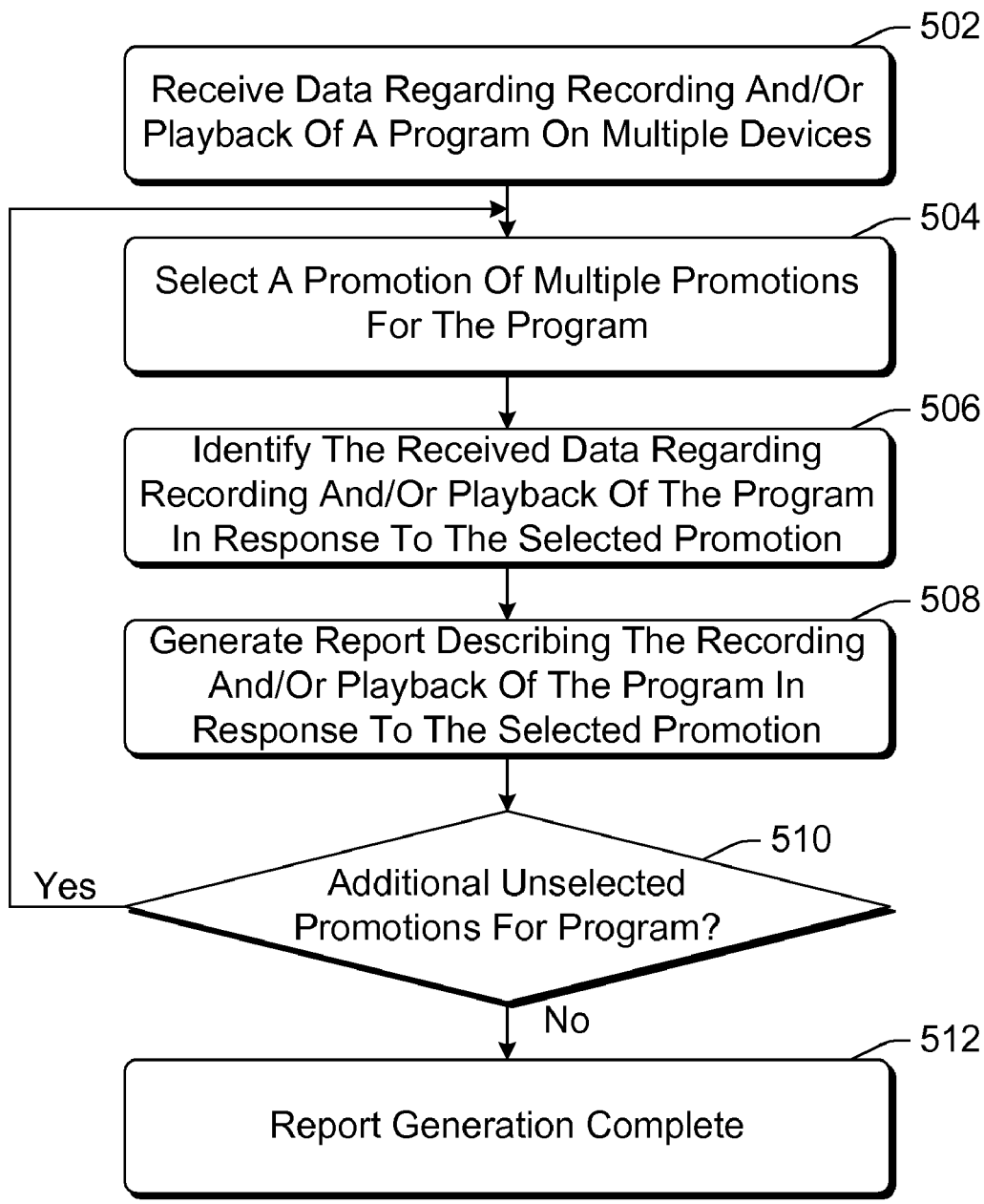
FIG. 5 is a flowchart illustrating another example process for the program promotion feedback in accordance with one or more embodiments.

FIG. 5 is a flowchart illustrating an example process 500 for the program promotion feedback in accordance with one or more embodiments. Process 500 is carried out by any party or device collecting data, such as data warehouse 208 of FIG. 2 or content source 206 of FIG. 2, and can be implemented in software, firmware, hardware, or combinations thereof. Process 500 is an example process for one or more aspects of the program promotion feedback; additional discussions of program promotion feedback are also included herein with reference to other Figures.

Initially, data regarding the recording and/or playback of a program on multiple consumer devices is received (act 502). This data is, for example, data regarding program recording and/or playback 112 of FIG. 1. The program has multiple corresponding promotions, and one of these multiple promotions for the program is selected (act 504). The particular promotion selected in act 504 can be selected in any of a variety of different manners, such as randomly, in order of promotion identifier, according to some other rules or processes, and so forth.

The data regarding recording and/or playback of the program in response to the selected promotion is identified (act 506). As discussed above, the various information regarding the recording and/or playback of the program is associated with the promotion identifier, so this data can be readily identified in act 506. A report is then generated describing the recording and/or playback of the program in response to the selected promotion (act 508). This report is feedback regarding how well the selected promotion enticed users to record and/or playback the corresponding program. The report can include any of the information that was received in act 502, such as what percentage of users recorded the corresponding program in response to the promotion, what percentage of users actually played back all of the corresponding program, what percentage of users deleted the recorded program without playing back the recorded program, and so forth.

A check is then made as to whether there are any unselected promotions for the program (act 510). If there are any unselected promotions, then process 500 returns to select one of the unselected promotions in act 504. However, if there are no unselected promotions, then the report generation process for the program is complete (act 512).

Figure 6:
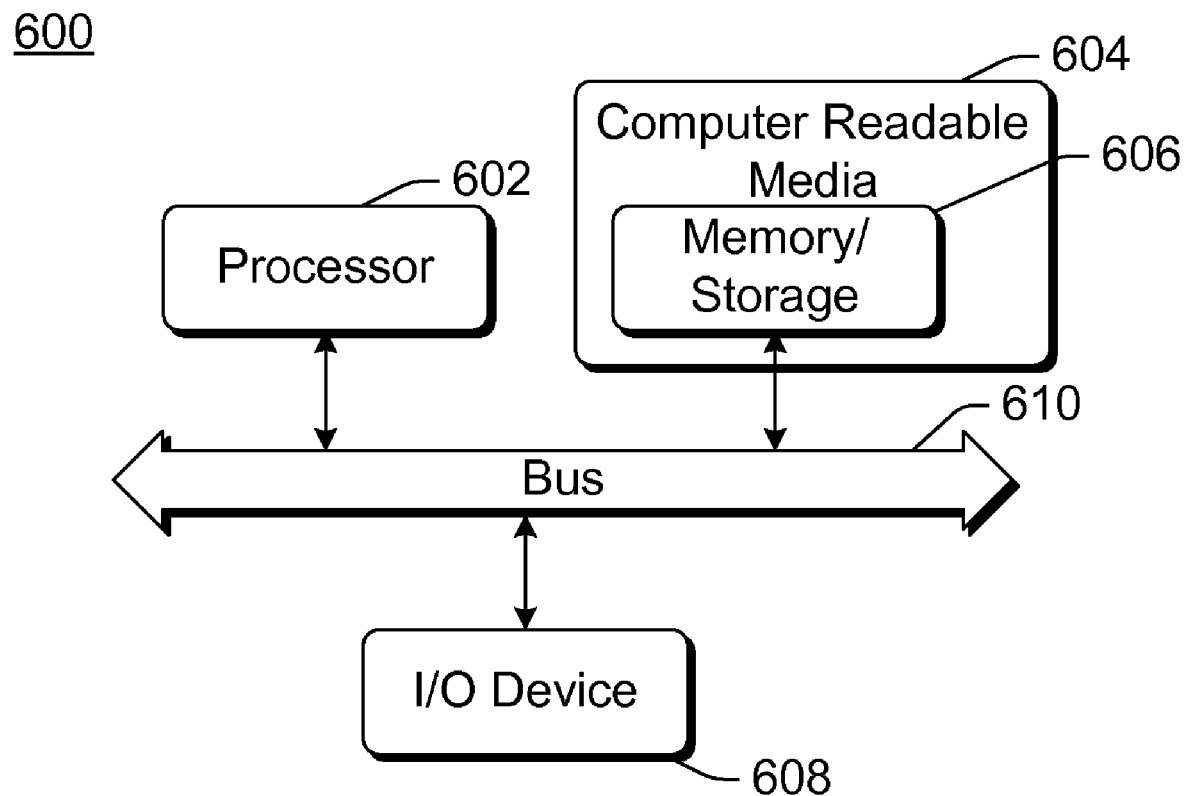
FIG. 6 illustrates an example computing device that can be configured to implement the program promotion feedback in accordance with one or more embodiments.

FIG. 6 illustrates an example computing device 600 that can be configured to implement the program promotion feedback in accordance with one or more embodiments. Computing device 600 can, for example, be a consumer device 100 of FIG. 1, be a consumer device 202 or 204 of FIG. 2, implement a data warehouse 208 of FIG. 2, implement a content source 206 of FIG. 2, and so forth.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or I/O device(s) 608 can be included as part of, or alternatively may be coupled to, computing device 600. Bus 610 represents one or more of any of several types of bus structures, including a memory bus or memory controller, a peripheral bus, an accelerated graphics port, and a processor or local bus using any of a variety of bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit(s) 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Additionally, it should be noted that in one or more embodiments the techniques discussed herein can be implemented in hardware. For example, one or more logic circuits, application-specific integrated circuits (ASICs), programmable logic devices (PLDs), and so forth can be created and/or configured to implement the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer storage media having stored thereon multiple instructions that, when executed by one or more processors of a device, cause the one or more processors to:
   initiate playback of a promotion corresponding to a program;
   receive a user request to watch the program;
   determine that the user request to watch the program is made in response to the promotion if the user request to watch the program is received while the promotion is being played back or within a threshold amount of time after the promotion is played back;
   output information regarding the user request to watch the program in response to determining that the user request to watch the program is made in response to the promotion, the information including an identifier of the promotion;
   perform one or both of recording the program and playback of the program; and
   output additional information regarding one or both of the recording and the playback in response to one or both of the recording or the playback of the program, the additional information including the identifier of the promotion.

2. One or more computer storage media as recited in claim 1, wherein the user request is a request to record a subsequently broadcast program, wherein to perform is to record the subsequently broadcast program, and wherein to output the additional information is to output additional information regarding the recording of the subsequently broadcast program.

3. One or more computer storage media as recited in claim 2, wherein to perform is further to playback a recorded program obtained by recording the subsequently broadcast program, and wherein to output the additional information is to output additional information regarding playback of the recorded program.

4. One or more computer storage media as recited in claim 1, the user request being a request to immediately begin playback of the program.

5. One or more computer storage media as recited in claim 1, the additional information comprising additional information identifying an elapsed time between recording of the program and playback of the program.

6. One or more computer storage media as recited in claim 1, wherein to receive the user request is to receive the user request from a second device on which the promotion is played back.

7. One or more computer storage media as recited in claim 1, the instructions further causing the one or more processors to:
   receive a user request to purchase an additional service in response to a promotion for the additional service; and
   output further additional information regarding a selection by the user to purchase the additional service, the further additional information regarding the selection including an identifier of the promotion for the additional service.

8. One or more computer storage media as recited in claim 1, wherein to output the additional information is to output the additional information to a data warehouse that collects information regarding recording and playback of the program in response to multiple promotions played back at multiple devices.

9. A method comprising:
   initiating playback of a promotion for a program;
   receiving, from each of multiple devices, data regarding a user request to watch the program;
   determine that the user request to watch the program is received in response to the promotion when the user request is received while the promotion is being played back or within a threshold amount of time after the promotion is played back;
   receiving, from each of the multiple devices, additional data regarding one or both of recording of the program by the device and playback of the program by the device, both the data and the additional data including an identifier of the promotion for the program, and the data received in response to the user request and the additional data received in response to one or both of the recording of the program or the playback of the program;
   identifying the received data and the received additional data in response to the promotion; and
   generating, using the identified data and the identified additional data, a report describing the recording of the program and the playback of the program in response to the promotion.

10. A method as recited in claim 9, further comprising repeating the receiving, receiving, identifying, and generating for multiple programs.

11. A method as recited in claim 9, the generating comprising generating the report describing the recording of the program and the playback of the program including information regarding how well the promotion enticed users of the multiple devices to both record the program and playback the program.

12. A method comprising:
   distributing, to different users, multiple different promotions for a program, each of the multiple different promotions including a promotion identifier; and
   receiving feedback from different consumer devices used by the different users, the feedback including information regarding, for each promotion identifier, a user request to watch the program, the feedback received when it is determined by one of the different consumer devices that the user request to watch the program is received in response to the promotion based on the user request to watch the program being received while the promotion is being played back or within a threshold amount of time after the promotion is played back, the feedback further including additional information regarding, for each promotion identifier, recording of the program and playback of the program at the different consumer devices, the information received in response to the user request and the additional information received in response to one or both of the recording of the program and the playback of the program.

13. A method as recited in claim 12, the feedback comprising further additional information regarding both how well the multiple different promotions enticed the different users to record the program and how well the multiple different promotions enticed the different users to playback the program.

14. A method as recited in claim 12, the feedback including interval information regarding one or both of the recording of the program and the playback of the program.

15. A method as recited in claim 12, the feedback including event occurrence information regarding one or both of the recording of the program and the playback of the program.

16. A method as recited in claim 12, the feedback including duration information regarding one or both of the recording of the program and playback of the program.

* * * * *